United States Patent [19]

Nishijima et al.

[11] Patent Number: 4,475,234
[45] Date of Patent: Oct. 2, 1984

[54] BINARY PATTERN SIGNAL PRODUCING APPARATUS FOR OPTICAL CHARACTER RECOGNITION

[75] Inventors: Yasuo Nishijima; Tetsuo Miura; Naoto Tsukakoshi; Kazunari Egami; Tetsuo Umeda, all of Tokyo, Japan

[73] Assignee: Nippon Electric Co., Ltd., Tokyo, Japan

[21] Appl. No.: 345,905

[22] Filed: Feb. 4, 1982

[30] Foreign Application Priority Data

Feb. 4, 1981 [JP] Japan .................................. 56-15484
Feb. 9, 1981 [JP] Japan ............................. 56-17057[U]

[51] Int. Cl.³ ............................................... G06K 9/00
[52] U.S. Cl. .......................................... 382/1; 382/48; 382/50
[58] Field of Search ................... 382/1, 48, 50, 51, 52, 382/53, 54, 61, 63, 64, 66; 209/584, 587; 73/900; 358/284, 174, 177, 179, 282

[56] References Cited

U.S. PATENT DOCUMENTS

4,034,341 7/1977 Isono et al. ............................ 382/48
4,158,835 6/1979 Miura et al. .......................... 382/48
4,162,481 7/1979 DuVall .................................. 382/52

Primary Examiner—Leo H. Boudreau
Assistant Examiner—Michael D. Parker
Attorney, Agent, or Firm—Sughrue, Mion, Zinn, Macpeak, and Seas

[57] ABSTRACT

A binary pattern signal producing apparatus for optical character recognition comprises a pre-scanning section for determining an area containing the information to be scanned, a scanning apparatus for producing a signal in accordance with the luminance of the scanning area, an automatic gain control circuit for controlling the level of the information signal in accordance with the level of a portion of the same information signal representing less than the entire scanned area, and a comparison circuit responsive to the output of the automatic gain control circuit for generating the binary pattern signal. In addition to or in place of a gate circuit which is used to provide only a portion of the information signal to the gain control terminal of the automatic gain control device, the apparatus may include noise eliminating circuitry for removing pulsive noise from the gain control signal.

10 Claims, 17 Drawing Figures

BINARY PATTERN SIGNAL PRODUCING APPARATUS FOR OPTICAL CHARACTER RECOGNITION

BACKGROUND OF THE INVENTION

The present invention relates to optical character recognition and, more particularly, to a binary pattern signal producing apparatus for optical character recognition in which a pattern signal delivered from an optical character scanner scanning the surface of a mail article is converted into a binary pattern signal to be supplied to a character recognition unit.

In a flying spot scanner as an example of the optical character scanner, a spot light on the CRT screen is applied to the surface of the mail article through a lens device, and the reflected light from the surface of the mail article is received by a photoelectric transducer such as a photo-multiplier in which address information on the mail article is changed into a corresponding pattern signal. The pattern signal is compared with a predetermined threshold level in order to convert it to a binary pattern signal and the binary pattern signal is then transferred to the character recognition unit. In this case, a level of the pattern signal delivered from the photoelectric transducer changes depending on color or luminance of the surface of the mail article. To cope with this level change problem, the pattern signal from the photoelectric transducer is applied to an amplifier with an automatic gain control (AGC) circuit which keeps the level of the pattern signal substantially constant. The AGC circuit controls the gain of the amplifier in response to the level of the pattern signal such that when the level of the pattern signal is high, the gain is reduced.

In mail articles having windows or labels on their faces, an address is generally written inside the window or on the label. The reflectivity at the window or the label is often lower than that at its surrounding area of the mail article face and sometimes a part of the surrounding area is subjected to scanning together with the window and label. In this case, a pattern signal obtained by the reflected light from the area surrounding the window or the label is dominant over a pattern signal obtained from the window or the label containing the address information, because the reflectivity at the surrounding area is higher than that at the window or the label, and the AGC circuit depends mainly upon the dominant pattern signal corresponding to the area surrounding the window or the label. Therefore, it has often occurred in the prior art binary pattern signal producing apparatus that a binary pattern signal representing the address information cannot be extracted from the pattern signal corresponding to the window or the label containing the address description.

When the window is covered with a transparent film such as cellophane film, the reflected light rays from the transparent film which have an intensity several times larger than that of the reflecting light rays from the surrounding area of the mail face is frequently projected onto the photo-electric transducer, so that impulse noise appears in the pattern signal and the AGC circuit depends upon the high level of the pulse noise which is inevitably adopted as a reference level for AGC. Therefore, the level of the pattern signal corresponding to the address description in the window becomes relatively small and no binary pattern signal representative of address characters and symbols is obtained, resulting in failure of reading the address information in the window. Thus, it is impossible in the prior art apparatus to completely read the address on the mail article which has the window or the label containing the address description.

SUMMARY OF THE INVENTION

Therefore, an object of the present invention is to provide a binary pattern signal producing apparatus for an optical character recognition which can produce a binary pattern signal correctly containing address information even if a portion with higher or lower reflectivity than the address location is contained in the scanning area.

Another object of the present invention is to provide a binary pattern signal producing apparatus for an optical character recognition which can correctly produce a binary pattern signal even if high level pulsive noise is contained in the pattern signal derived from the photoelectric transducer.

According to the present invention, there is provided a binary pattern signal producing apparatus for optical character recognition comprising: address location determining means for determining a main scanning area on a mail article where an address is described on it, optical main scanning means for precisely scanning the main scanning area determined by the address location determining means to produce a pattern signal, gate signal producing means for producing a gate signal representing a predetermined area within the main scanning area, gate means for passing the pattern signal produced with respect to the predetermined area under the control of the gate signal, a variable gain amplifier for amplifying the pattern signal delivered from the main scanning means so as to keep the level of the pattern signal substantially constant in response to the pattern signal derived through the gate means, and comparing means for comparing the pattern signal outputted from the variable gain amplifier with a predetermined threshold level thereby to produce a binary pattern signal.

According to another aspect of the present invention, there is provided a binary pattern signal producing apparatus for an optical character recognition based on the above technical concept which further involves a noise eliminating circuit for eliminating pulsive noise contained in a pattern signal to be transmitted to the variable gain amplifier.

DETAILED DESCRIPTION OF PREFERRED EMBODIMENT

Figure 1:
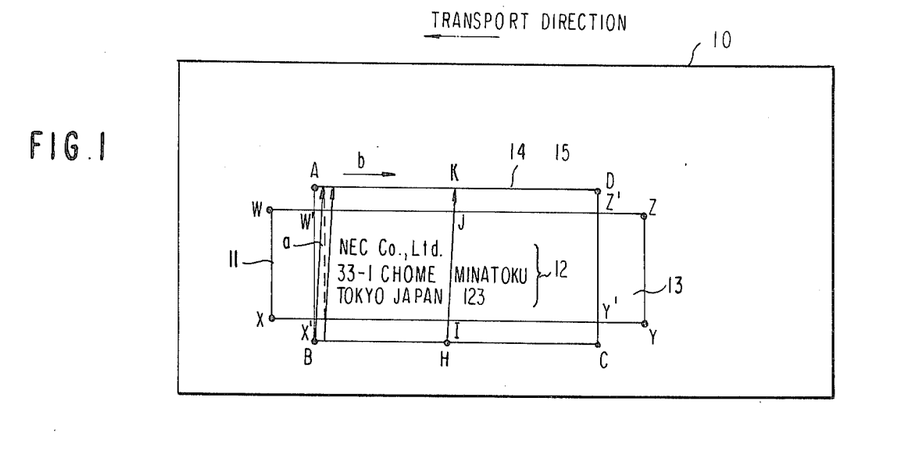
FIG. 1 schematically illustrates an example of a mail article with an address description and a scanning area to be scanned.

FIG. 1 shows an example of a mail article with a window. The mail article 10 has a window 11 defined by points W, X, Y and Z through which a mail paper 13 is appearing which in turn has a color of a low reflectivity in a visible ray region, such as blue, and on which an address 12 is described. An enclosure paper 15 surrounding the window 11 has a color of a higher reflectivity than the mail paper 13, such as white. The address location on the face of the mail article 10 may be detected by a technique disclosed in U.S. Pat. No. 4,034,341 or through a window-detection technique described in U.S. Pat. No. 4,158,835. Assume now that a square area 14 defined by points A, B, C and D is determined as a scanning area (or a main scanning area) by prescanning. An optical character scanner (not shown) scans the scanning area 14 such that the scanning starts from a point B in the direction of an arrow a and successively repeats in the direction of an arrow b.

Figure 2A:
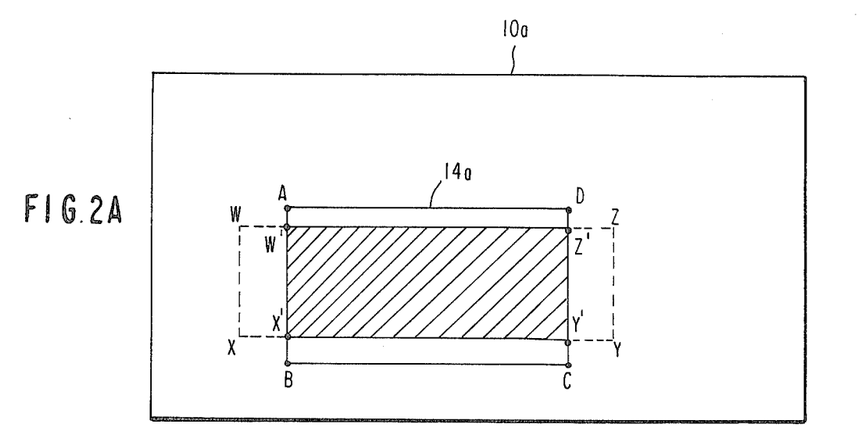
FIG. 2A is an explanatory diagram for diagrammatically illustrating a pattern produced by a binary pattern signal which is obtained by a prior art binary pattern signal producing apparatus from a pattern signal with respect to the mail article of FIG. 1.

FIG. 2A illustrates a diagram 14a depicted by a binary pattern signal which is obtained through a prior art technique when the small article 10 (FIG. 1) is scanned by an optical character scanner. Since the amplifying gain for the pattern signal is controlled on the basis of the reflecting light from the high reflectivity portion 15, the entire low reflectivity portion 13 is judged as a portion uniformly carrying some black information. As seen from the figure, the prior art technique can not extract characters corresponding to the address 12 in FIG. 1.

Figure 2B:
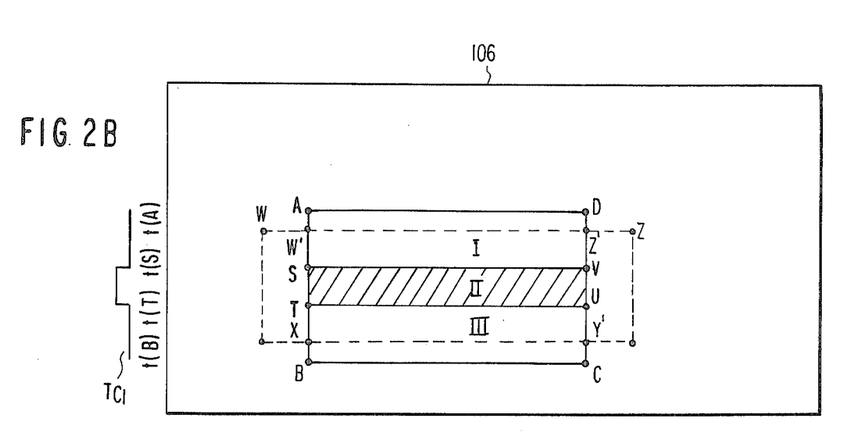
FIG. 2B illustrates an example of a scanning area and an object area for AGC to be processed by an AGC circuit according to the present invention.

FIG. 2B shows an AGC-object area to which the automatic gain control is applied according to the present invention, and that area is shown in the hatched form surrounded by points S, T, U and V. $TC_1$ designates a gate signal defining the AGC-object area. For ease of explanation, rectangular areas surrounded by A, S, V and D, by S, T, U and V, and by T, B, C and U are assumed as scanning areas I, II and III.

Figure 3:
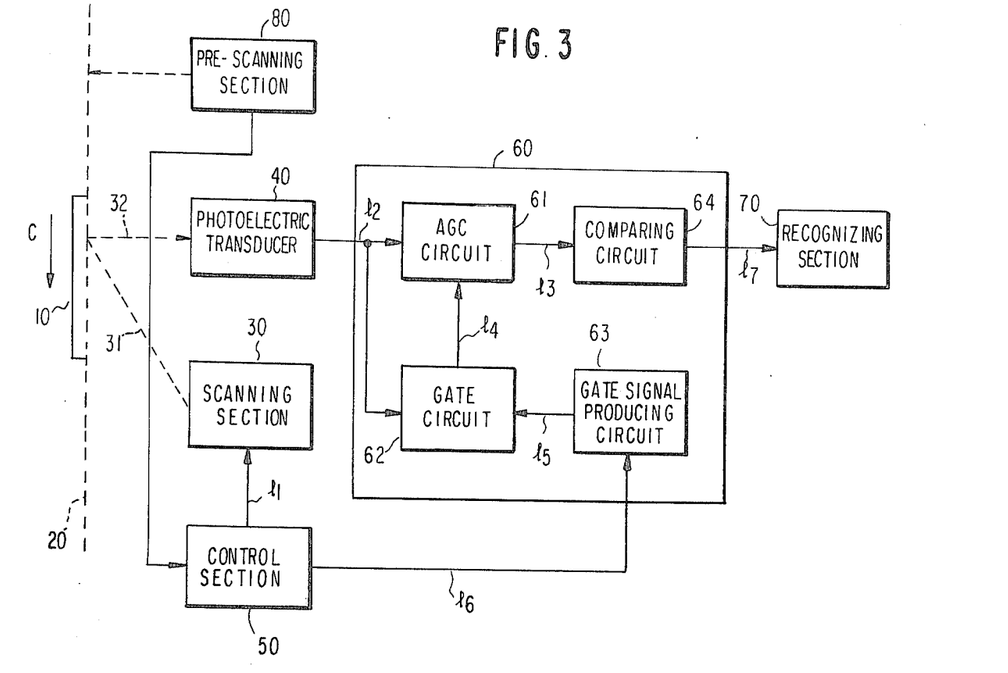
FIG. 3 is a block diagram of an optical character recognition system employing a first embodiment of a binary pattern signal producing apparatus according to the present invention.
Figure 5A:
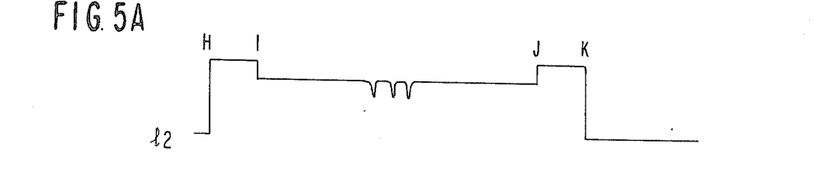
FIGS. 5(A), (B), (C), (D) and (E) illustrate waveforms of signals at points in the first embodiment of the present invention.
Figure 5B:
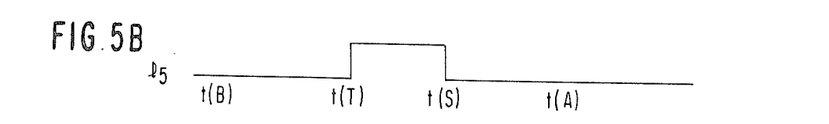
Figure 5C:
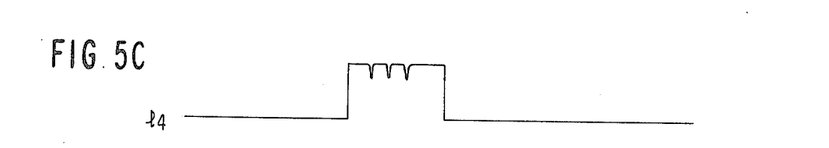
Figure 5D:
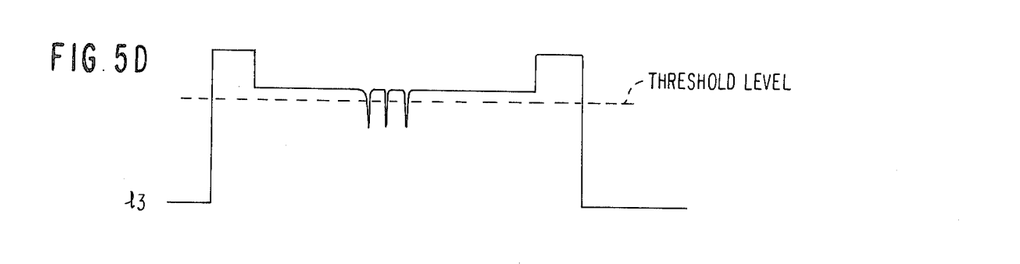

Referring to FIG. 3 which illustrates an optical character recognition system, a mail article 10 is transported along the transport path 20 at a fixed speed in a transport direction c, i.e., a direction from the top of the bottom in FIG. 3, and while being transported, is subjected to the optical character recognition of the address described thereon. The optical character recognition system comprises a binary pattern signal producing apparatus according to an embodiment of the present invention which includes a scanning section 30, a photoelectric transducing section 40, a control section 50, a binary signal producing section 60 and a pre-scanning section 80. A binary pattern signal produced by the section 60 is applied to a recognizing section 70. The pre-scanning section 80 detects an address position. The pre-scanning section 80 may employ the technique which detects character blocks on a mail article and recognizes the character blocks located at predetermined positions as a character block including an addressee's name. The address position detected by the pre-scanning section 80 is transferred to the control section 50. The control section 50 transfers a control signal through a line $l_1$ so as to cause the scanning section 30 to scan an area with some margin slightly larger than the detected address area. The scanning section 30 scans by a scanning spot 31 over the rectangular scanning area 14 defined by four corner points A, B, C and D (FIG. 1) under control of a control signal derived from the control section 50. Scattered light 32 from the mail article 10 is focused on the photoelectrical transducer 40. The photoelectric transducer 40 transduces the scattered light into an electrical pattern signal whose level is varied in accordance with a variation in an intensity of the scattered light. The optoelectrically converted signal (pattern signal) obtained by the scanning and the photoelectric conversion is led through a line $l_2$ to the binary signal producing section 60. An example of a signal on the line $l_2$ is illustrated in FIG. 5A. The signal illustrated is a pattern signal obtained when the distance KH in FIG. 1 is scanned. The section 60 is comprised of an automatic gain controlled amplifier circuit 61 (hereinafter referred to as an AGC circuit), a gate circuit 62, a gate signal producing circuit 63 and a comparing circuit 64. The AGC circuit 61 controls its amplifying gain in accordance with an AGC control signal level transferred through a line $l_4$. The AGC control signal is produced in the gate circuit 62 by passing the pattern signal under the control of the gate signal. In other words, the gain of the AGC circuit 61 is controlled in response to the pattern signal level scanned at the scanning area II shown in FIG. 2B, so as to extract an address description in the window. This area II is selected as a central region occupying 50%, for example, of the entire scanning area 14. The pattern signal derived from the AGC circuit 61 is led to the comparing circuit 64 through a line $l_3$. An example of a signal on the line $l_3$ is illustrated in FIG. 5D. The gate circuit 62 passes the pattern signal led through the led $l_2$ in response to a gate signal led through a line $l_5$. The signal obtained by the gate circuit 62 is led through the line $l_4$ to the AGC circuit 61. An example of a signal appearing on the line $l_4$ is shown in FIG. 5C. The gate signal producing circuit 63 produces the gate signal by making use of the signal on a line $l_6$ derived from the control section 50. That is to say, it produces the gate signal of $TC_1$ shown in FIG. 2B. The gate signal is led to a gate circuit 62 through a line $l_5$. An example of the gate signal appearing on the line $l_5$ is also illustrated in FIG. 5B.

Figure 5E:
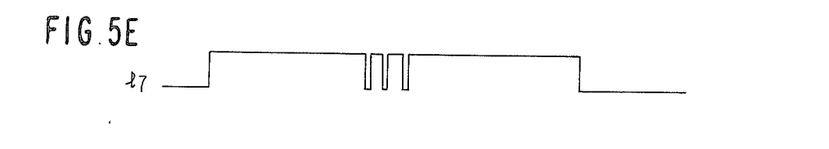

The comparing circuit 64 compares the pattern signal led through the line $l_3$ with a predetermined threshold value and produces a binary pattern signal. The binary pattern signal is led through a line $l_7$ to the recognizing section 70 where it is subjected to a character recognizing process. An example of a signal on the line $l_7$ is illustrated in FIG. E. When a time constant in the AGC operation is set long, the pattern signals obtained from the remaining scanning areas I and III (FIG. 2B) may be subjected to the AGC operation in accordance with the level of the pattern signal from the AGC-object area II.

Figure 4:
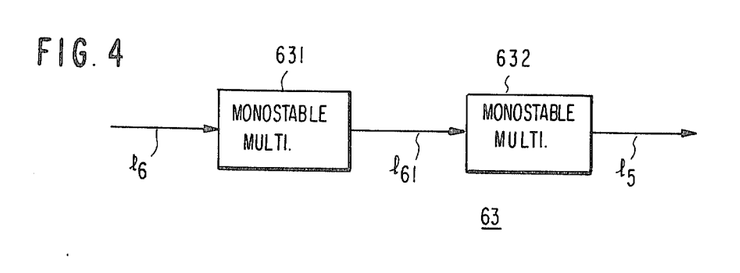
FIG. 4 is a block diagram showing an example of a gate signal producing circuit.
Figure 6:
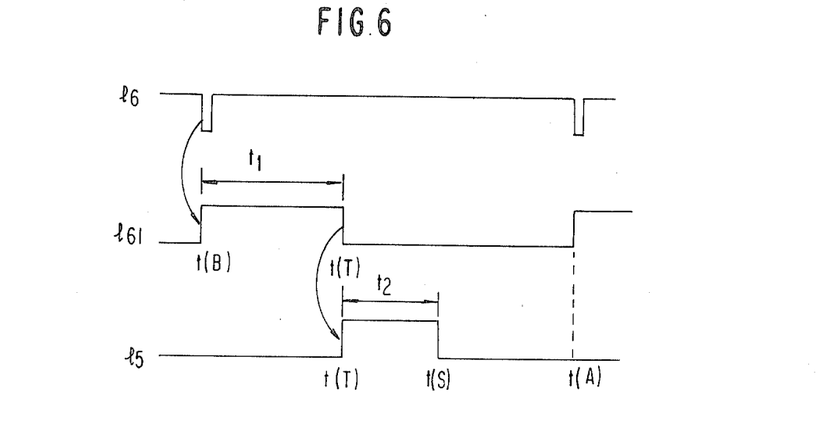
FIG. 6 illustrates signal waveforms in the gate signal producing circuit.

FIG. 4 shows an example of the gate signal producing circuit 63 which is composed of two mono-stable multivibrators 631 and 632. The first-stage multivibrator 631 produces a pulse having a pulse width $t_1$ from the start of the main scanning to the begining of the AGC-object area II. The pulse width $t_1$ corresponds to the difference between times t(B) and t(T) shown in FIG. 5B. The second-stage mono-stable multivibrator 632 produces a pulse having a pulse width $t_2$ from the trailing edge of the pulse led through a line 61. The pulse width $t_2$ corresponds to the pulse width of the gate signal $TC_1$, i.e., the width of the AGC-object area II in FIG. 2B. The waveforms on the lines $l_6$, $l_{61}$ and $l_5$ are illustrated in FIG. 6 for showing the gate signal producing operation. Though the two mono-stable multivibrators are employed for producing the gate signal in this example, a counter may be employed instead of the multivibrators.

Even where the mail article to be scanned has a window or a label and a reflectivity at the window or label portion is lower than that at its surrounding area of the mail article, the gate circuit 62 and the gate signal producing circuit 63 provided according to the present invention control the AGC circuit 61 to restrict the AGC operation to the low reflective area, so that the address description on the low reflectivity area in a window or on the label can be converted into an accurate binary pattern signal.

Figure 7:
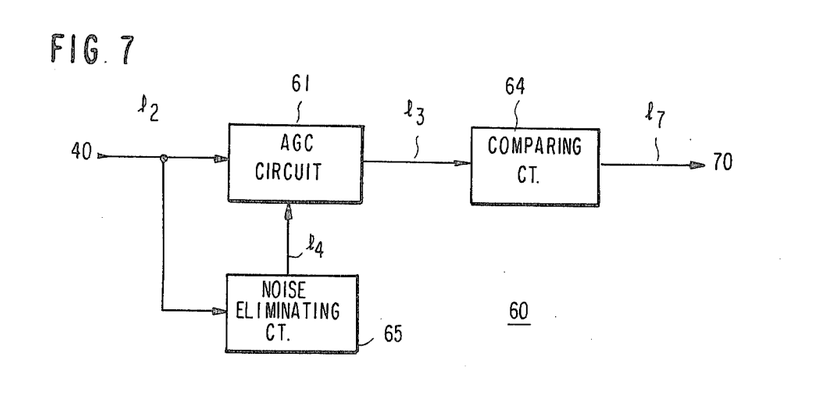
FIG. 7 is a block diagram showing a portion of a second embodiment of a binary pattern signal producing apparatus according to the present invention.

FIG. 7 shows a binary signal producing section 60' according to a second embodiment of the present invention, for removing a disadvantage caused by a pulse noise contained in the pattern signal derived from the photoelectric transducer. This circuit 60' includes a noise eliminating circuit 65 in addition to the AGC circuit 61 and the comparing circuit 64 shown in FIG. 3. The pattern signal containing the pulsive noise is applied from the photoelectric transducer 40 via a line $l_2$ to the noise eliminating circuit 65, which may be a low pass filter, where the pulsive noise is eliminated. The noise-eliminated pattern signal is applied to the AGC circuit 61 as the gain control signal.

Figure 8A:
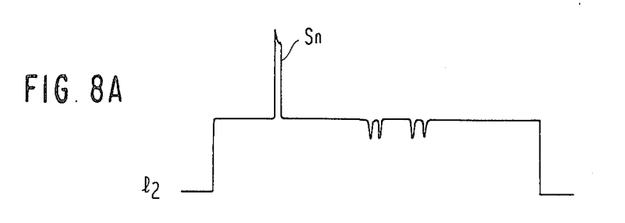
FIGS. 8(A), (B), (C), and (D) illustrate waveforms of signals at points in the second embodiment.
Figure 8B:
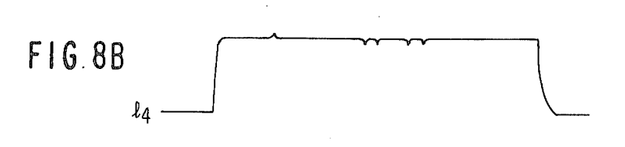
Figure 8C:
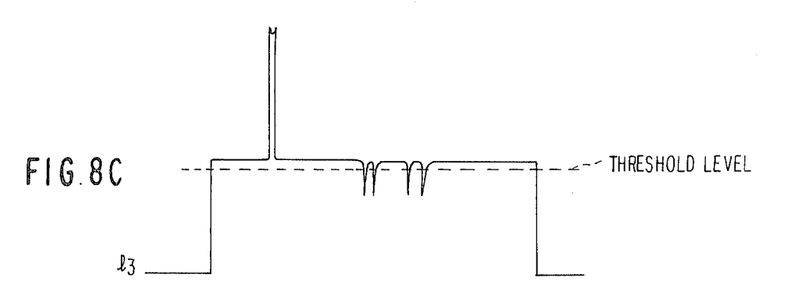
Figure 8D:
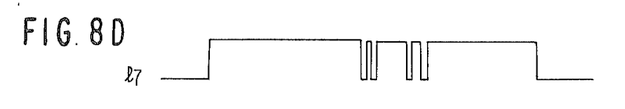

FIGS. 8A to 8D are waveforms for explaining the operation of the circuit 60' of FIG. 7. FIG. 8A shows a waveform of an output signal at the line $l_2$ from the photoelectric transducer 40, which contains pulsive noise Sn. FIG. 8B shows a waveform of a signal at the line $l_4$ delivered from the noise eliminating circuit 65. In FIG. 8C, there is illustrated a waveform of the gain-controlled pattern signal and a threshold level at the line $l_3$. A waveform illustrated in FIG. 8D is that of a binary pattern signal as an output signal from the comparing circuit 64, which is transferred to the recognizing section 70.

Figure 9:
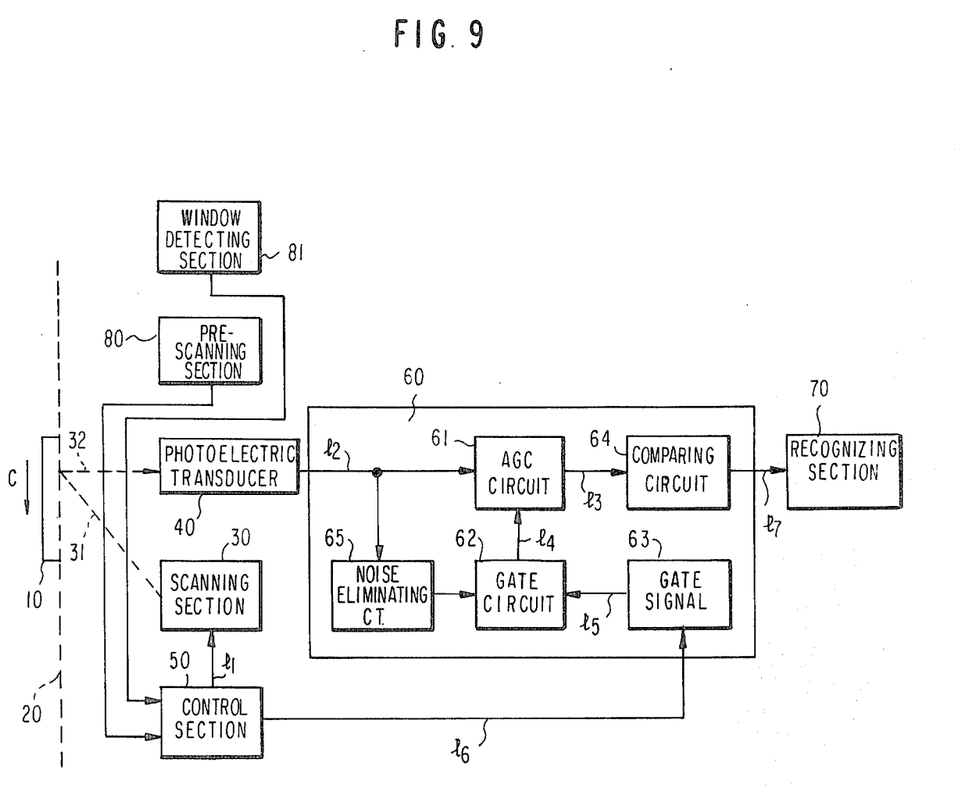
FIG. 9 is a block diagram showing an optical character recognition system employing a third embodiment of a binary pattern signal producing apparatus according to the present invention.

FIG. 9 illustrates an optical character recognition system employing a binary pattern signal producing apparatus according to a third embodiment of the present invention. The third embodiment is different from the first embodiment shown in FIG. 3 in that a window detecting section 81 is additionally provided at the preceding stage of the pre-scanning section 80, and that a noise eliminating circuit 65 is provided at the preceding stage of the gate circuit 62. In the present embodiment, the pre-scanning section 80 only extracts the character blocks located within the window detected by the window detecting section 81. Accordingly, the number of character blocks to be subjected to a check as to an interrelation among the character blocks thereby to extract the particular character block which is the address description is limited and therefore, the process to detect the address location is very simple. The advantage resulting from the provision of the noise eliminating circuit 65 is the same as that of the second embodiment. The noise eliminating circuit 65 may be inserted between the gate circuit 62 and the AGC circuit 61.

What is claimed is:

1. A binary pattern signal producing apparatus for optical recognition of characters on an article comprising:
    area location detecting means for determining a main scanning area of said article characters to be read;
    main scanning means for scanning said main scanning area to produce a pattern signal in accordance with luminance on the surface of said article;
    gate signal producing means for producing a gate signal designating a predetermined area within said main scanning area;
    gate means for passing the pattern signal produced with respect to said predetermined area under control of the gate signal;
    variable gain amplifying means receiving as a control signal the pattern signal passed by said gate means and also receiving the pattern signal delivered from said main scanning means, for controlling the received level of the pattern signal in response to the level of said control signal; and
    comparing means for comparing the pattern signal delivered from said variable gain amplifying means with a predetermined threshold level to produce a binary pattern signal.

2. A binary pattern signal producing apparatus for an optical character recognition comprising:
    optical scanning means for scanning the surface of an article to produce a pattern signal according to luminance on the surface of the article;
    noise eliminating means receiving the pattern signal delivered from said optical scanning means for eliminating a pulsive noise contained therein;
    variable gain amplifying means receiving the pattern signal delivered from said optical scanning means for controlling the level of the received pattern signal in response to the level of the pattern signal delivered from said noise eliminating means; and
    comparing means for comparing the pattern signal delivered from said variable gain amplifying means with a predetermined threshold level to produce a binary pattern signal.

3. A binary pattern signal producing apparatus as claimed in claim 1, further comprising a noise eliminating means for eliminating a pulsive noise from said control signal.

4. A binary pattern signal producing apparatus for an optical character recognition as claimed in claims 1 or 3, wherein said area location detecting means further includes window detecting means for detecting a window on the scanned article.

5. An optical character recognition apparatus comprising:
    scanning means for scanning an area of an article having a character to be recognized to produce a first pattern signal in accordance with luminance on the surface of said area;
    extracting means for extracting from said first pattern signal a second pattern signal corresponding to a predetermined area within said area;
    variable-gain amplifying means for amplifying said first pattern signal with a variable gain,
    said variable-gain amplifying means receiving said second pattern signal from said extracting means for controlling the level of said first pattern signal in response to said second pattern signal;

signal producing means for producing a binary pattern signal in response to the amplified first pattern signal delivered from said variable-gain amplifying means; and a character recognition means for recognizing a character by use of said binary pattern signal.

6. A binary pattern signal producing apparatus as defined in claim 2, further comprising area location detecting means for determining a scanning area of said article surface to be scanned by said optical scanning means;

gate means receiving a signal from said noise eliminating means and responsive to a gate signal for providing said noise eliminating means signal to said variable gain amplifying means only during generation of said gate signal; and means for generating said gate signal during scanning of less than the entire portion of said scanning area.

7. A binary pattern signal producing apparatus as defined in claim 2, further comprising area location detecting means for determining a scanning area of said article surface to be scanned by said optical scanning means;

gate means disposed between said optical scanning means and said noise eliminating means for providing said pattern signal from said optical scanning means to said noise eliminating means only during generation of a gate signal; and means for generating said gate signal during optical scanning of less than the entire portion of said scanning area.

8. A binary pattern signal producing apparatus as defined in claim 3, wherein said noise eliminating means is disposed between said optical main scanning means and said gate means.

9. A binary pattern signal producing apparatus for producing a binary pattern signal representing an optically recognized character on an article, comprising:

area location means for determining a main scanning area on said article within which said character is located;

scanning means for scanning said area and producing a pattern signal in accordance with luminance on the surface of said article within said area;

automatic gain control means for controlling the gain of said pattern signal in accordance with the amplitude of a portion of said pattern signal representing less than the entire main scanning area; and means responsive to an output from said automatic gain control means for producing said binary pattern.

10. A binary pattern signal producing apparatus as defined in any one of claims 1, 2, 5 or 9, wherein said article comprises a mail article and said scanning area includes an address of said mail article.

* * * * *

UNITED STATES PATENT AND TRADEMARK OFFICE
CERTIFICATE OF CORRECTION

PATENT NO. : 4,475,234

DATED : October 2, 1984

INVENTOR(S) : Yasuo NISHIJIMA; Tetsuo MIURA; Naoto TSUKAKOSHI; Kazunari EGAMI; Tetsuo UMEDA It is certified that error appears in the above-identified patent and that said Letters Patent is hereby corrected as shown below:

Column 3, line 38, "small" should be --mail--.

Column 4, line 44, delete "led" (second occurrence) and add --line--;

line 62, delete "Fig. E" and insert --Fig. 5E--.

Signed and Sealed this

Twenty-first Day of May 1985

[SEAL]

Attest:

DONALD J. QUIGG

Attesting Officer  Acting Commissioner of Patents and Trademarks